United States Patent
Wang et al.

(10) Patent No.: US 12,050,270 B2
(45) Date of Patent: Jul. 30, 2024

(54) IMAGE CAPTURING CONTROL METHOD AND APPARATUS, IMAGE CAPTURING SYSTEM AND TOF CAMERA

(71) Applicant: Beijing Tusen Weilai Technology Co., Ltd., Beijing (CN)

(72) Inventors: Ming Wang, Beijing (CN); Xiaodi Hou, San Diego, CA (US); Jianan Hao, Beijing (CN); Jie Sun, Beijing (CN)

(73) Assignee: BEIJING TUSEN WEILAI TECHNOLOGY CO., LTD, Beijing (CN)

( * ) Notice: Subject to any disclaimer, the term of this patent is extended or adjusted under 35 U.S.C. 154(b) by 754 days.

(21) Appl. No.: 16/923,660

(22) Filed: Jul. 8, 2020

(65) Prior Publication Data
US 2020/0371243 A1 Nov. 26, 2020

Related U.S. Application Data

(63) Continuation of application No. PCT/CN2018/105471, filed on Sep. 13, 2018.

(30) Foreign Application Priority Data

Jan. 24, 2018 (CN) .......................... 201810066597.8

(51) Int. Cl.
*G01S 7/486* (2020.01)
*G01S 7/4865* (2020.01)
(Continued)

(52) U.S. Cl.
CPC .......... *G01S 17/894* (2020.01); *G01S 7/4865* (2013.01); *G01S 7/4868* (2013.01); *H04N 5/33* (2013.01)

(58) Field of Classification Search
CPC ............................. G01S 17/18; G01S 7/4865
See application file for complete search history.

(56) References Cited

U.S. PATENT DOCUMENTS 5,781,147 A * 7/1998 Elliott ................... G01S 13/865
342/54
9,739,609 B1 8/2017 Lewis
(Continued)

FOREIGN PATENT DOCUMENTS

CN 102590821 A 7/2012
CN 106662651 A 4/2015
(Continued)

OTHER PUBLICATIONS

International Search Report and Written Opinion Mailed Nov. 28, 2018 in International Application No. PCT/CN2018/1054761.
(Continued)

*Primary Examiner* — Yuqing Xiao
*Assistant Examiner* — Zhengqing Qi
(74) *Attorney, Agent, or Firm* — Perkins Coie LLP (57) ABSTRACT

The present disclosure provides an image capturing control method and apparatus, an image capturing system and a Time-of-Flight (TOF) camera, capable of solving the problem in the related art that a clear image of an object at a specific distance cannot be captured in harsh weather. The method includes: determining infrared light emission time, exposure start time and exposure end time for a TOF camera based on a predetermined target distance range; transmitting, to the TOF camera, parameter control information containing the infrared light emission time, exposure start time and exposure end time; and receiving an image containing an object located within the target distance range that is captured by the TOF camera in accordance with the parameter control information.

18 Claims, 4 Drawing Sheets

(51) Int. Cl.
 *G01S 17/894* (2020.01)
 *H04N 5/33* (2023.01)

(56) References Cited

U.S. PATENT DOCUMENTS

| | | | |
|---|---|---|---|
| 10,656,275 B1* | 5/2020 | Bills | G01S 17/87 |
| 2007/0058038 A1* | 3/2007 | David | G01S 7/483 |
| | | | 348/135 |
| 2007/0158770 A1* | 7/2007 | Kawahito | G01S 7/4863 |
| | | | 348/E3.018 |
| 2015/0092019 A1 | 4/2015 | Asano et al. | |
| 2015/0160340 A1* | 6/2015 | Grauer | G01S 17/88 |
| | | | 356/5.04 |
| 2016/0073088 A1 | 3/2016 | Cohen et al. | |
| 2016/0314613 A1 | 10/2016 | Nowozin et al. | |
| 2016/0320486 A1 | 11/2016 | Murai | |
| 2018/0252800 A1* | 9/2018 | Morcom | G01S 17/89 |

FOREIGN PATENT DOCUMENTS

| | | |
|---|---|---|
| CN | 104796613 A | 7/2015 |
| CN | 105723238 A | 6/2016 |
| CN | 108259744 A | 7/2018 |
| WO | 2016171913 A1 | 10/2016 |
| WO | 2017050633 A1 | 3/2017 |

OTHER PUBLICATIONS

Unterberger, Michael. European Application No. 18902695.8, Extended European Search Report Mailed Sep. 30, 2021, pp. 1-7.
Chinese Application No. 201810066597 First Search Report, Mailed Apr. 23, 2019, pp. 1.
Chinese Application No. 201810066597 Supplementary Search Report, Mailed Apr. 26, 2020 pp. 1.
Australian Patent Office, 1st Examination Report for AU Appl. No. 2018405051, mailed Jul. 26, 2023, 3 pages.
Communication Pursuant to Article 94(3) EPC from European Patent Application No. 18902695.8 dated Mar. 18, 2024.

* cited by examiner

IMAGE CAPTURING CONTROL METHOD AND APPARATUS, IMAGE CAPTURING SYSTEM AND TOF CAMERA

This application is a patent application under 35 U.S.C. § 120 and claims priority to International Patent Application No. PCT/CN2018/105476, filed Sep. 13, 2018, which further claims the benefit of priority of Chinese Patent Application No. 201810066597.8, titled "IMAGE CAPTURING CONTROL METHOD AND APPARATUS, IMAGE CAPTURING SYSTEM AND TOF CAMERA", filed on Jan. 24, 2018, the content of which is incorporated herein by reference in its entirety.

TECHNICAL FIELD

The present disclosure relates to image capturing technology, and more particularly, to an image capturing control method, an image capturing control apparatus, an image capturing system and a Time-of-Flight (TOF) camera.

BACKGROUND

With the development in technical fields such as unmanned aerial vehicles, unmanned ships, unmanned driving, Virtual Reality (VR), three-dimensional (3D) scanning, robot obstacle avoidance, Simultaneous Localization And Mapping (SLAM), and the like, cameras have been widely used in these technical fields. One of the major disadvantages of cameras is that they are vulnerable to environment impacts. When the natural light is too strong or too weak, imaging quality of a camera could be poor. Especially in some harsh weather such as rainstorms, blizzards, heavy fog, sandstorms or the like, the natural light is poor, the imaging quality of a camera could be poor, and the view range of the camera could be very short. In an image captured by the camera, only objects within a short distance can be identified, while farther objects cannot be identified. How to obtain a clear image of an object at a specific distance in harsh weather has become a technical problem to be solved in the aforementioned technical field.

SUMMARY

In view of the above problem, the present disclosure provides an image capturing control method and apparatus, capable of solving the problem in the related art that a clear image of an object at a specific distance cannot be captured in harsh weather.

In a first aspect, an image capturing control method is provided according to an embodiment of the present disclosure. The image capturing control method includes: determining infrared light emission time, exposure start time and exposure end time for a TOF camera based on a predetermined target distance range; transmitting, to the TOF camera, parameter control information containing the infrared light emission time, the exposure start time and the exposure end time; and receiving an image containing an object located within the target distance range that is captured by the TOF camera in accordance with the parameter control information.

In a second aspect, an image capturing control apparatus is provided according to an embodiment of the present disclosure. The image capturing control apparatus includes: a time calculation unit configured to determine infrared light emission time, exposure start time and exposure end time for a TOF camera based on a predetermined target distance range; a control unit configured to transmit, to the TOF camera, parameter control information containing the infrared light emission time, the exposure start time and the exposure end time; and an image receiving unit configured to receive an image containing an object located within the target distance range that is captured by the TOF camera in accordance with the parameter control information.

In a third aspect, an image capturing control apparatus is provided according to an embodiment of the present disclosure. The image capturing control apparatus includes a processor and at least one memory storing at least one machine executable instruction. The processor is operative to execute the at least one machine executable instruction to: determine infrared light emission time, exposure start time and exposure end time for a Time-of-Flight (TOF) camera based on a predetermined target distance range; transmit, to the TOF camera, parameter control information containing the infrared light emission time, the exposure start time and the exposure end time; and receive an image containing an object located within the target distance range that is captured by the TOF camera in accordance with the parameter control information.

In a fourth aspect, an image capturing system is provided according to an embodiment of the present disclosure. The image capturing system includes a TOF camera and an image capturing control apparatus. The image capturing control apparatus is configured to determine infrared light emission time, exposure start time and exposure end time for the TOF camera based on a predetermined target distance range; transmit, to the TOF camera, parameter control information containing the infrared light emission time, the exposure start time and the exposure end time; and receive an image containing an object located within the target distance range that is captured by the TOF camera in accordance with the parameter control information. The TOF camera is configured to receive the parameter control information from the image capturing control apparatus, and capture the image containing the object located within the target distance range in accordance with the parameter control information.

In a fifth aspect, a TOF camera is provided. The TOF camera includes a data processor, an infrared light emitter and an image sensor. The data processor is configured to receive parameter control information containing infrared light emission time, exposure start time and exposure end time, configure emission time of the infrared light emitter in accordance with the infrared light emission time, and configure an exposure parameter for the image sensor based on the exposure start time and the exposure end time. The infrared light emitter is configured to emit infrared light in accordance with the infrared light emission time. The image sensor is configured to perform exposure in accordance with the exposure start time and the exposure end time to generate data of an image containing an object located within a target distance range.

The TOF camera provides a depth-of-field image by using a Complementary Metal Oxide Semiconductor (CMOS, i.e., image sensor) pixel array and an active modulated light source technique. It continuously emits modulated infrared light to a target object and uses the image sensor to receive the emitted light returned from the target object, so as to detect the time of flight of the light pulse, thereby obtaining the distance of the target object. The TOF camera can not only detect objects having small areas (such as lines, cone objects, etc.), but also have a long range, high resolution, high response speed and invulnerability to impacts of ambient light. The technical solution of the present disclosure utilizes the characteristics of the TOF camera to control the TOF camera to capture a clear image of an object within a target distance range by accurately controlling the infrared light emission time, exposure start time and exposure end time of the TOF camera. Therefore, even in a harsh environment, the technical solution of the present disclosure can still capture the clear image of the object within the target distance range, which solves the technical problem in the related art.

The other features and advantages of the present disclosure will be explained in the following description, and will become apparent partly from the description or be understood by implementing the present disclosure. The objects and other advantages of the present disclosure can be achieved and obtained from the structures specifically illustrated in the written description, claims and figures.

In the following, the solutions according to the present disclosure will be described in detail with reference to the figures and embodiments.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. It is apparent to those skilled in the art that the figures described below only illustrate some embodiments of the present disclosure and other figures can be obtained from these figures without applying any inventive skills. In the figures.

DETAILED DESCRIPTION OF THE EMBODIMENTS

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

The image capturing control method and apparatus, image capturing system and TOF camera according to the embodiment of the present disclosure can be applied to unmanned vehicles (such as trucks, public transportation vehicles, buses, cars, tractors, sprinklers, garbage trucks, etc.), drones, unmanned ships, robots, etc. The present disclosure is not limited to any specific application scenario.

Embodiment 1

Figure 1:
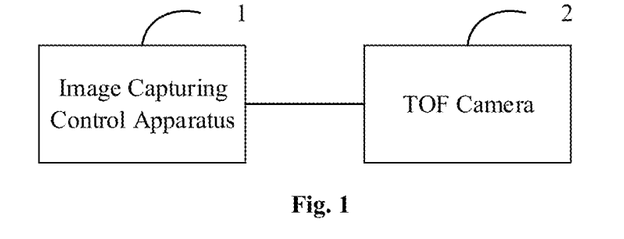
FIG. 1 is a first schematic diagram showing a structure of an image capturing system according to an embodiment of the present disclosure.

FIG. 1 is a first schematic diagram showing a structure of an image capturing system according to an embodiment of the present disclosure. Referring to FIG. 1, the system includes an image capturing control apparatus 1 and a TOF camera 2.

The image capturing control apparatus 1 is configured to determine infrared light emission time, exposure start time and exposure end time for the TOF camera 2 based on a predetermined target distance range; transmit, to the TOF camera 2, parameter control information containing the infrared light emission time, exposure start time and exposure end time; and receive an image containing an object located within the target distance range that is captured by the TOF camera 2 in accordance with the parameter control information.

The TOF camera 2 is configured to receive the parameter control information from the image capturing control apparatus 1, and capture the image containing the object located within the target distance range in accordance with the parameter control information.

In an embodiment of the present disclosure, one image capturing control apparatus 1 may correspond to one TOF camera 2 or multiple TOF cameras 2, and the present disclosure is not limited to this.

In an embodiment of the present disclosure, the frequency at which the image capturing control apparatus 1 transmits the parameter control information to the TOF camera 2 may be higher than or equal to the frame rate of the TOF camera 2. Assuming that within a period of time, the infrared light emission time in the parameter control information transmitted to the TOF camera 2 for the first time from the image capturing control apparatus 1 is a predetermined initial value $T_1$, the infrared light emission time in the parameter control information transmitted to the TOF camera 2 for the i-th time from the image capturing control apparatus 1 is $T_i$, where $T_i = T_1 + (i-1)/f$ and f is the frequency at which the image capturing control apparatus 1 transmits the parameter control information to the TOF camera 2.

In an embodiment of the present disclosure, the target distance range refers to a range of distance from the TOF camera. The target distance range may be a fixed value set in advance in the image capturing control apparatus 1 depending on the application scenario, or it may be a parameter value received by the image capturing control apparatus 1 from a frontend of a client end. Here the parameter value can be entered by an operator on an operation interface in the frontend of the client end. Alternatively, the target distance range can be determined by the image capturing control apparatus 1 based on feedbacks from other sensors (such as ordinary cameras, air quality sensors, humidity sensors, etc.). The present disclosure is not limited to how the target distance range can be obtained. The value of the target distance range can be flexibly set depending on actual requirements. For example, the target distance range can be set to 50~100 meters in e.g., heavy fogs or moderate sandstorms, or to 0~50 meters in e.g., dense fogs or severe sand storms. The present disclosure is not limited to any specific value of the target distance range.

Figure 2:
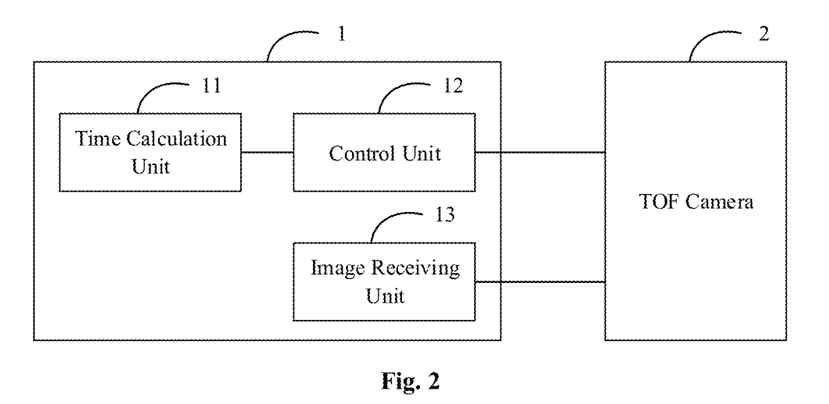
FIG. 2 is a second schematic diagram showing a structure of an image capturing system according to an embodiment of the present disclosure.

In an embodiment of the present disclosure, the image capturing control apparatus 1 may has a structure shown in FIG. 2 and include: a time calculation unit 11 configured to determine the infrared light emission time, the exposure start time and the exposure end time for the TOF camera based on the predetermined target distance range; a control unit 12 configured to transmit, to the TOF camera, the parameter control information containing the infrared light emission time, exposure start time and exposure end time; and an image receiving unit 13 configured to receive the image containing the object located within the target distance range that is captured by the TOF camera in accordance with the parameter control information.

Figure 3:
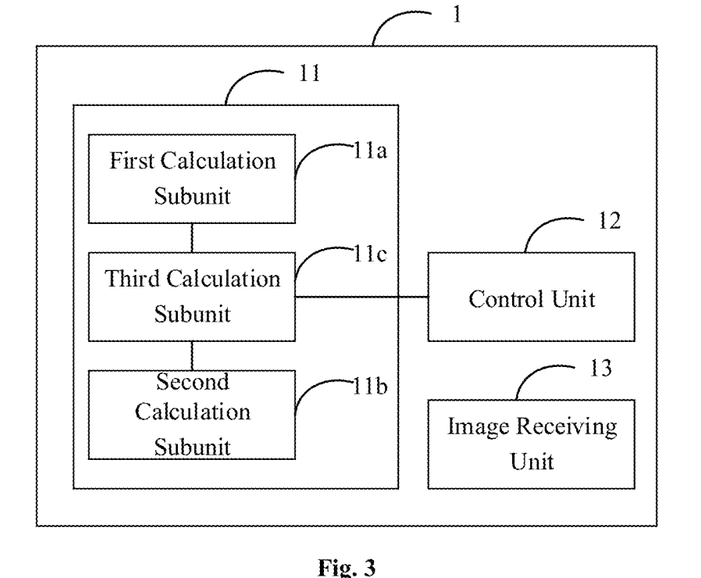
FIG. 3 is a first schematic diagrams showing a structure of an image capturing control apparatus according to an embodiment of the present disclosure.

In an embodiment of the present disclosure, the time calculation unit 11 may have a structure shown in FIG. 3 and include a first calculation subunit 11a, a second calculation subunit 11b, and a third calculation subunit 11c.

The first calculation subunit 11a is configured to estimate, based on a lower limit distance value of the target distance range, a first time length required for the TOF camera to receive infrared light reflected from an object having a distance equal to the lower limit distance value after emitting the infrared light.

The second calculation subunit 11b is configured to estimate, based on an upper limit distance value of the target distance range, a second time length required for the TOF camera to receive infrared light reflected from an object having a distance equal to the upper limit distance value after emitting the infrared light.

The third calculation subunit 11c is configured to determine the exposure start time and the exposure end time for the TOF camera based on the predetermined infrared light emission time, the first time length and the second time length.

Assuming that the target distance range is $[d_1, d_2]$, the lower limit distance value of the target distance range is $d_1$ (in units of meters), and the upper limit distance of the target distance range is $d_2$ (in units of meters), the first time length is denoted as $\Delta t_1$, and the second time length is denoted as $\Delta t_2$, then $\Delta t_1 = d_1/c$ and $\Delta t_2 = d_2/c$, where c is the speed of light ($3 \times 10^8$ m/s).

Figure 4:
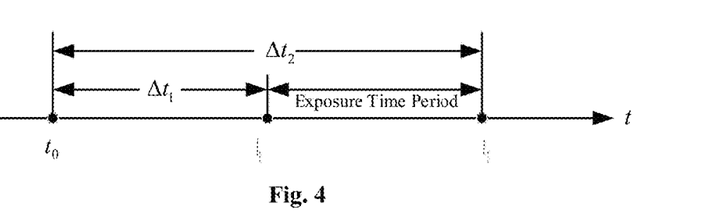
FIG. 4 is a first schematic diagram showing how to determine exposure start time and exposure end time according to an embodiment of the present disclosure.

In an example, the third calculation subunit 21c can be configured to determine the exposure start time as a sum of the infrared light emission time and the first time length, and determine the exposure end time as a sum of the infrared light emission time and the second time length. As shown in FIG. 4, assuming that the infrared light emission time is $t_0$, the exposure start time is denoted as $t_1$, and the exposure end time denoted as $t_2$, then $t_1 = t_0 + 2(d_1/c)$ and $t_2 = t_0 + 2(d_2/c)$.

Figure 5:
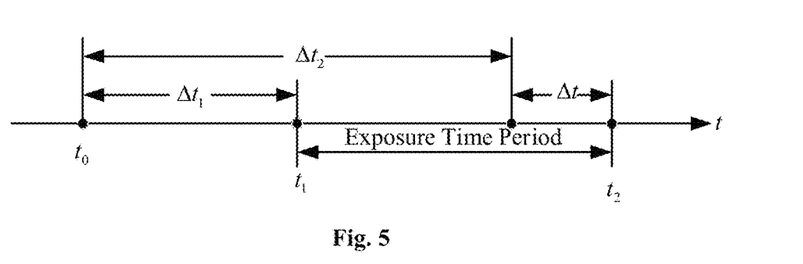
FIG. 5 is a second schematic diagram showing how to determine exposure start time and exposure end time according to an embodiment of the present disclosure.

Since the CMOS of the TOF camera requires a certain amount of time for charge accumulation, if the exposure stops immediately after light reflected from the object having the distance equal to the upper limit distance value arrives at the CMOS, it may cause underexposure due to insufficient charge accumulation for this portion of the emitted light. In an embodiment of the present disclosure, after the light reflected from the object having the distance equal to the upper limit distance value arrives at the CMOS, the exposure, instead of being stopped immediately, continues for an extended period of time (referred to as an exposure extension time length, denoted as $\Delta t$). The third calculation subunit 11c can be configured to determine the exposure start time as a sum of the infrared light emission time and the first time length, and determine the exposure end time as a sum of the infrared light emission time, the second time length and a predetermined exposure extension time length. As shown in FIG. 5, assuming that the infrared light emission time is $t_0$, the exposure start time is denoted as the exposure extension time length is denoted as $\Delta t$, and the exposure end time denoted as $t_2$, then $t_1 = t_0 + 2(d_1/c)$ and $t_2 = t_0 + 2(d_2/c) + \Delta t$. The value of the exposure extension time length $\Delta t$ in the embodiment of the present disclosure can be obtained according to experimental data or empirical values, and the present disclosure is not limited to this.

Figure 6:
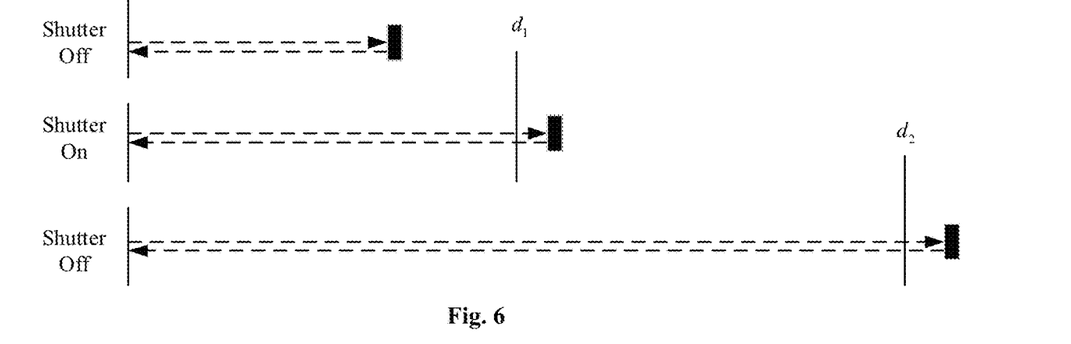
FIG. 6 is a schematic diagram showing how to filter reflected light according to an embodiment of the present disclosure.

In an embodiment of the present disclosure, the time length from the emission of the infrared light to its arrival at an object having a distance of $d_1$ is $d_1/c$, and the time length for the light reflected from the object to return to the CMOS surface of the TOF camera is $d_1/c$. The time length from the emission of the infrared light to its arrival at an object having a distance of $d_2$ is $d_2/c$, and the time length for the light reflected from the object to return to the CMOS surface of the TOF camera is $d_2/c$. The TOF camera starts exposure once the light reflected from the object having the distance of $d_1$ is received on the CMOS surface, and stops the exposure a short while after the light reflected from the object having the distance of $d_2$ is received on the CMOS surface. Therefore, the TOF camera has not started exposure and the shutter of the TOF camera is off when light reflected from an object having a distance smaller than $d_1$ is received on the CMOS surface, such that the light reflected from the object having the distance smaller than $d_1$ can be filtered out. Similarly, the TOF camera has stopped the exposure, i.e., the shutter of the TOF camera is off, when light reflected from an object having a distance larger than $d_2$ is received on the CMOS surface, such that the light reflected from the object having the distance larger than $d_2$ can be filtered out. Thus, with the solution according to the present disclosure, the light reflected from objects outside the target distance range can be filtered out and the light reflected from objects within the target distance range can be retained, such that the image captured by the TOF camera can be an image containing objects within the target distance range, without objects outside the target distance range, as shown in FIG. 6.

Figure 7:
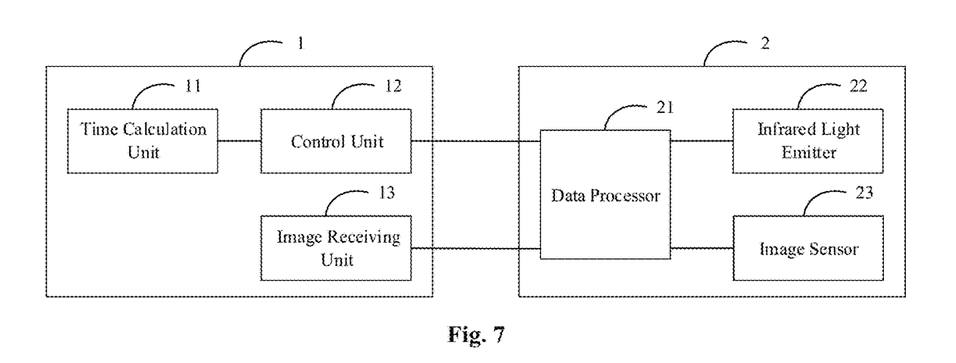
FIG. 7 is a third schematic diagram showing a structure of an image capturing system according to an embodiment of the present disclosure.

In an embodiment of the present disclosure, the TOF camera 2 shown in FIGS. 1 and 2 may have a structure shown in FIG. 7, and include a data processor 21, an infrared light emitter 22, and an image sensor 23.

The data processor 21 is configured to receive parameter control information containing infrared light emission time, exposure start time and exposure end time, configure emission time of the infrared light emitter 22 in accordance with the infrared light emission time, and configure an exposure parameter for the image sensor 23 based on the exposure start time and the exposure end time.

The infrared light emitter 22 is configured to emit infrared light in accordance with the infrared light emission time.

The image sensor 23 is configured to perform exposure in accordance with the exposure start time and the exposure end time to generate data of an image containing an object located within a target distance range.

Figure 8:
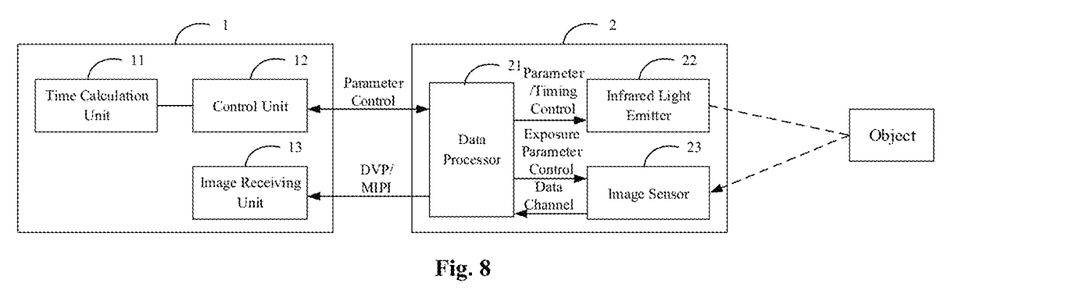
FIG. 8 is a fourth schematic diagram showing a structure of an image capturing system according to an embodiment of the present disclosure.

In an embodiment of the present disclosure, the data processor 21 may transmit the data of the image, including brightness data and depth data of pixels, to the image capturing control apparatus 1 via a DVP interface or Mobile Industry Processor Interface (MIPI) interface. The image capturing control apparatus 1 can transmit the parameter control information to the data processor 21 via a parameter control channel, as shown in FIG. 8.

Figure 9:
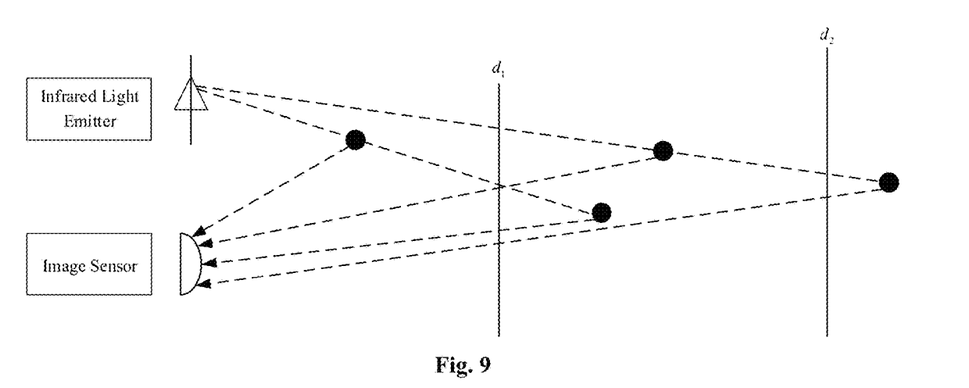
FIG. 9 is a schematic diagram showing a TOF camera emitting infrared light and receiving reflected light according to an embodiment of the present disclosure.

As shown in FIG. 9, the infrared light emitter 22 emits infrared light. When the infrared light meets an object, the object reflects the light, and the surface of the image sensor 23 receives the reflected light from the object.

Embodiment 2

Figure 10:
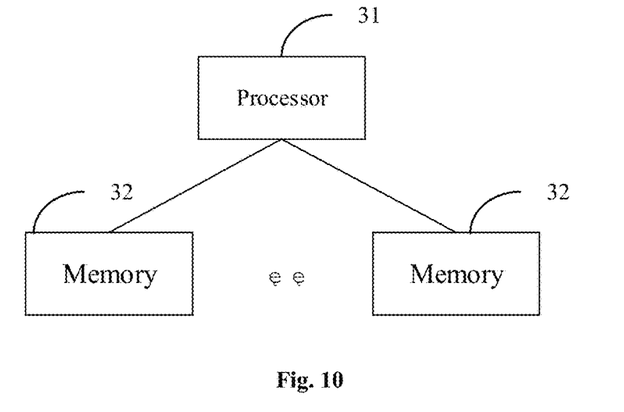
FIG. 10 is a second schematic diagrams showing a structure of an image capturing control apparatus according to an embodiment of the present disclosure.

Based on the same concept as the above Embodiment 1, an image capturing control apparatus is provided according to Embodiment 2 of the present disclosure. As shown in FIG. 10, the apparatus includes a processor 31 and at least one memory 32 storing at least one machine executable instruction. The processor 31 is operative to execute the at least one machine executable instruction to: determine infrared light emission time, exposure start time and exposure end time for a TOF camera based on a predetermined target distance range; transmit, to the TOF camera, parameter control information containing the infrared light emission time, exposure start time and exposure end time; and receive an image containing an object located within the target distance range that is captured by the TOF camera in accordance with the parameter control information.

In some embodiments, the processor 31 being operative to execute the at least one machine executable instruction to determine the infrared light emission time, the exposure start time and the exposure end time for the camera based on the predetermined target distance range may include the processor 31 being operative to execute the at least one machine executable instruction to: estimate, based on a lower limit distance value of the target distance range, a first time length required for the TOF camera to receive infrared light reflected from an object having a distance equal to the lower limit distance value after emitting the infrared light; estimate, based on an upper limit distance value of the target distance range, a second time length required for the TOF camera to receive infrared light reflected from an object having a distance equal to the upper limit distance value after emitting the infrared light; and determine the exposure start time and the exposure end time for the TOF camera based on the predetermined infrared light emission time, the first time length and the second time length.

In some embodiments, the processor 31 being operative to execute the at least one machine executable instruction to determine the exposure start time and the exposure end time for the TOF camera based on the predetermined infrared light emission time, the first time length and the second time length may include the processor 31 being operative to execute the at least one machine executable instruction to: determine the exposure start time as a sum of the infrared light emission time and the first time length; and determine the exposure end time as a sum of the infrared light emission time and the second time length.

In some embodiment, the processor 31 being operative to execute the at least one machine executable instruction to determine the exposure start time and the exposure end time for the TOF camera based on the predetermined infrared light emission time, the first time length and the second time length may include the processor being operative to execute the at least one machine executable instruction to: determine the exposure start time as a sum of the infrared light emission time and the first time length; and determine the exposure end time as a sum of the infrared light emission time, the second time length and a predetermined exposure extension time length.

Embodiment 3

Figure 11:
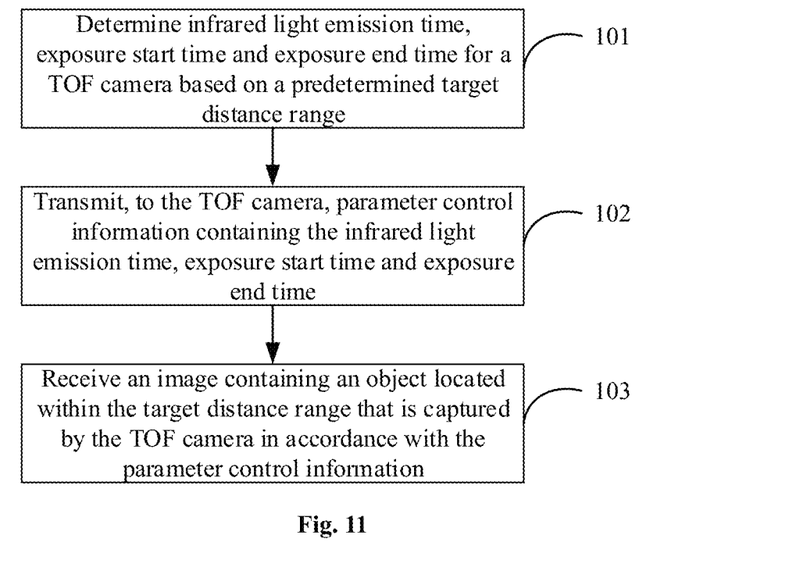
FIG. 11 is a flowchart illustrating an image capturing control method according to an embodiment of the present disclosure.

Based on the same concept as the above Embodiment 1, an image capturing control method is provided according to Embodiment 3 of the present disclosure. FIG. 11 is a flowchart illustrating the method, which including the following steps.

At step 101, infrared light emission time, exposure start time and exposure end time for a TOF camera are determined based on a predetermined target distance range.

At step 102, parameter control information containing the infrared light emission time, exposure start time and exposure end time is transmitted to the TOF camera.

At step 103, an image containing an object located within the target distance range is received. The image is captured by the TOF camera in accordance with the parameter control information.

Figure 12:
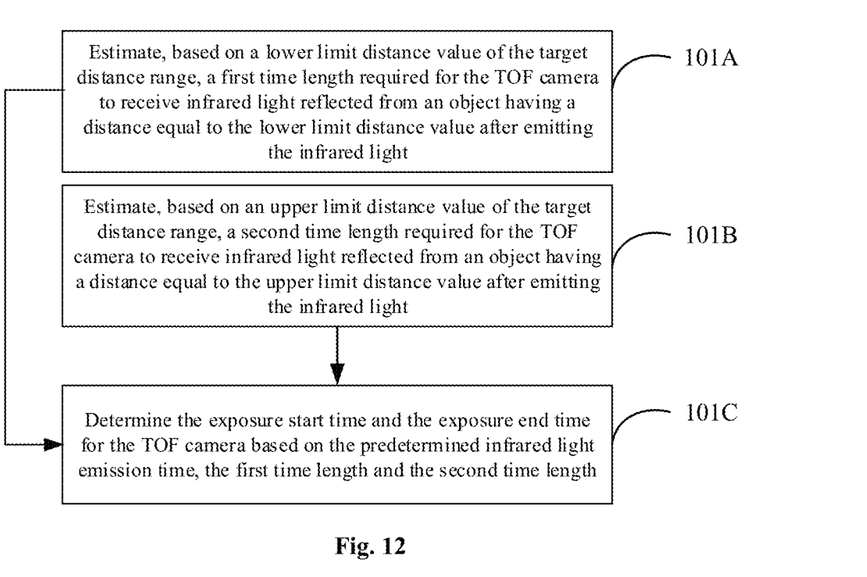
FIG. 12 is a flowchart illustrating a process for determining infrared light emission time, exposure start time, and exposure end time of a TOF camera according to an embodiment of the present disclosure.

In some embodiments, the step 101 can be implemented using the process shown in FIG. 12. The process includes the following steps.

At step 101A, based on a lower limit distance value of the target distance range, a first time length required for the TOF camera to receive infrared light reflected from an object having a distance equal to the lower limit distance value after emitting the infrared light is estimated.

At step 101B, based on an upper limit distance value of the target distance range, a second time length required for the TOF camera to receive infrared light reflected from an object having a distance equal to the upper limit distance value after emitting the infrared light is estimated.

At step 101C, the exposure start time and the exposure end time for the TOF camera are determined based on the predetermined infrared light emission time, the first time length and the second time length.

The above steps 101A and 101B are not necessarily to be performed in any specific order. The step 101A may be performed before, after, or simultaneously with the step 101B.

In an example, the step 101C may be implemented as: determining the exposure start time as a sum of the infrared light emission time and the first time length; and determining the exposure end time as a sum of the infrared light emission time and the second time length. For further details, reference can be made to the above Embodiment 1, and description thereof will be omitted here.

In another example, the step 101C may be implemented as: determining the exposure start time as a sum of the infrared light emission time and the first time length; and determining the exposure end time as a sum of the infrared light emission time, the second time length and a predetermined exposure extension time length. For further details, reference can be made to the above Embodiment 1, and description thereof will be omitted here.

The basic principles of the present disclosure have been described above with reference to the embodiments. However, it can be appreciated by those skilled in the art that all or any of the steps or components of the method or apparatus according to the present disclosure can be implemented in hardware, firmware, software or any combination thereof in any computing device (including a processor, a storage medium, etc.) or a network of computing devices. This can be achieved by those skilled in the art using their basic programming skills based on the description of the present disclosure.

It can be appreciated by those skilled in the art that all or part of the steps in the method according to the above embodiment can be implemented in hardware following instructions of a program. The program can be stored in a computer readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. Such integrated module can be implemented in hardware or software functional units. When implemented in software functional units and sold or used as a standalone product, the integrated module can be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. An image capturing control method, comprising:
   determining infrared light emission time, exposure start time and exposure end time for a Time-of-Flight (TOF) camera based on a predetermined target distance range;
   transmitting, to the TOF camera, parameter control information containing the infrared light emission time, the exposure start time and the exposure end time; and
   receiving an image containing an object located within the predetermined target distance range that is captured by the TOF camera in accordance with the parameter control information,
   wherein said determining the infrared light emission time, the exposure start time and the exposure end time for the TOF camera based on the predetermined target distance range comprises:
   estimating, based on an upper limit distance value of the predetermined target distance range, a time period required for the TOF camera to receive infrared light reflected from a position having a distance equal to the upper limit distance value after emitting the infrared light;
   determining the exposure end time for the TOF camera to stop receiving reflected infrared light as a sum of the infrared light emission time, the time period and a predetermined exposure extension time period, wherein, during the predetermined exposure extension time period, the TOF camera receives infrared light emitted by the TOF camera and reflected by a surrounding environment of the TOF camera,
   wherein the predetermined target distance range is dependent on the surrounding environment of the TOF camera, and the predetermined exposure extension time period is independent of the surrounding environment of the TOF camera.

2. The method of claim 1, wherein transmitting, to the TOF camera, the parameter control information comprises:
   transmitting, to the TOF camera, the parameter control information at a frequency higher than a frame rate of the TOF camera.

3. The method of claim 1, further comprising:
   generating, by the TOF camera during the predetermined exposure extension time period, image data including brightness data and depth data associated with the surrounding environment of the TOF camera based on the receive infrared light.

4. The method of claim 1, wherein the time period is a second time period, and wherein said determining the infrared light emission time, the exposure start time and the exposure end time for the TOF camera based on the predetermined target distance range further comprises:

estimating, based on a lower limit distance value of the predetermined target distance range, a first time period required for the TOF camera to receive infrared light reflected from another position having a distance equal to the lower limit distance value after emitting the infrared light.

5. The method of claim 4, wherein said determining the infrared light emission time, the exposure start time and the exposure end time for the TOF camera based on the predetermined target distance range further comprises:
determining the exposure start time as a sum of the infrared light emission time and the first time period.

6. An image capturing control apparatus, comprising:
a time calculation unit configured to determine infrared light emission time, exposure start time and exposure end time for a Time-of-Flight (TOF) camera based on a predetermined target distance range;
a control unit configured to transmit, to the TOF camera, parameter control information containing the infrared light emission time, the exposure start time and the exposure end time; and
an image receiving unit configured to receive an image containing an object located within the predetermined target distance range that is captured by the TOF camera in accordance with the parameter control information,
wherein the time calculation unit comprises:
a first calculation subunit configured to estimate, based on an upper limit distance value of the predetermined target distance range, a time period required for the TOF camera to receive infrared light reflected from a position having a distance equal to the upper limit distance value after emitting the infrared light; and
a second calculation subunit configured to determine the exposure end time for the TOF camera to stop receiving reflected infrared light as a sum of the infrared light emission time, the time period and a predetermined exposure extension time period, wherein, during the predetermined exposure extension time period, the TOF camera receives infrared light emitted by the TOF camera and reflected by a surrounding environment of the TOF camera,
wherein the predetermined target distance range is dependent on the surrounding environment of the TOF camera, and the predetermined exposure extension time period is independent of the surrounding environment of the TOF camera.

7. The apparatus of claim 6, wherein the control unit is configured to transmit, to the TOF camera, the parameter control information at a frequency higher than a frame rate of the TOF camera.

8. The apparatus of claim 6, wherein the time period is a second time period, and wherein the time calculation unit comprises:
a third calculation subunit configured to estimate, based on a lower limit distance value of the predetermined target distance range, a first time period required for the TOF camera to receive infrared light reflected from another position having a distance equal to the lower limit distance value after emitting the infrared light.

9. The apparatus of claim 8, wherein the second calculation subunit is further configured to:
determine the exposure start time as a sum of the infrared light emission time and the first time period.

10. An image capturing control apparatus, comprising a processor and at least one memory storing at least one machine executable instruction, the processor being operative to execute the at least one machine executable instruction to:
determine infrared light emission time, exposure start time and exposure end time for a Time-of-Flight (TOF) camera based on a predetermined target distance range;
transmit, to the TOF camera, parameter control information containing the infrared light emission time, the exposure start time and the exposure end time; and
receive an image containing an object located within the predetermined target distance range that is captured by the TOF camera in accordance with the parameter control information,
wherein the processor being operative to execute the at least one machine executable instruction to determine the infrared light emission time, the exposure start time and the exposure end time for the camera based on the predetermined target distance range comprises the processor being operative to execute the at least one machine executable instruction to:
estimate, based on an upper limit distance value of the predetermined target distance range, a time period required for the TOF camera to receive infrared light reflected from a position having a distance equal to the upper limit distance value after emitting the infrared light; and
determine the exposure end time for the TOF camera to stop receiving reflected infrared light as a sum of the infrared light emission time, the time period and a predetermined exposure extension time period, wherein, during the predetermined exposure extension time period, the TOF camera receives infrared light emitted by the TOF camera and reflected by a surrounding environment of the TOF camera,
wherein the predetermined target distance range is dependent on the surrounding environment of the TOF camera, and the predetermined exposure extension time period is independent of the surrounding environment of the TOF camera.

11. The apparatus of claim 10, wherein the time period is a second time period, and wherein the processor being operative to execute the at least one machine executable instruction to determine the infrared light emission time, the exposure start time and the exposure end time for the camera based on the predetermined target distance range comprises the processor being operative to execute the at least one machine executable instruction to:
estimate, based on a lower limit distance value of the predetermined target distance range, a first time period required for the TOF camera to receive infrared light reflected from another position having a distance equal to the lower limit distance value after emitting the infrared light.

12. The apparatus of claim 11, wherein the processor being operative to execute the at least one machine executable instruction to determine the infrared light emission time, the exposure start time and the exposure end time for the camera based on the predetermined target distance range comprises the processor being operative to execute the at least one machine executable instruction to:
determine the exposure start time as a sum of the infrared light emission time and the first time period.

13. An image capturing system, comprising a Time-of-Flight (TOF) camera and an image capturing control apparatus, wherein
the image capturing control apparatus is configured to determine infrared light emission time, exposure start time and exposure end time for the TOF camera based on a predetermined target distance range; transmit, to the TOF camera, parameter control information containing the infrared light emission time, the exposure start time and the exposure end time; and receive an image containing an object located within the predetermined target distance range that is captured by the TOF camera in accordance with the parameter control information, and the TOF camera is configured to receive the parameter control information from the image capturing control apparatus, and capture the image containing the object located within the predetermined target distance range in accordance with the parameter control information, wherein said determining the infrared light emission time, the exposure start time and the exposure end time for the TOF camera based on the predetermined target distance range comprises:

estimating, based on an upper limit distance value of the predetermined target distance range, a time period required for the TOF camera to receive infrared light reflected from a position having a distance equal to the upper limit distance value after emitting the infrared light;

determining the exposure end time for the TOF camera to stop receiving reflected infrared light as a sum of the infrared light emission time, the time period and a predetermined exposure extension time period, wherein, during the predetermined exposure extension time period, the TOF camera receives infrared light emitted by the TOF camera and reflected by a surrounding environment of the TOF camera, wherein the predetermined target distance range is dependent on the surrounding environment of the TOF camera, and the predetermined exposure extension time period is independent of the surrounding environment of the TOF camera.

14. The system of claim 13, wherein the time period is a second time period, and wherein said determining the infrared light emission time, the exposure start time and the exposure end time for the TOF camera based on the predetermined target distance range further comprises:

estimating, based on a lower limit distance value of the predetermined target distance range, a first time period required for the TOF camera to receive infrared light reflected from another position having a distance equal to the lower limit distance value after emitting the infrared light.

15. The system of claim 14, wherein said determining the infrared light emission time, the exposure start time and the exposure end time for the TOF camera based on the predetermined target distance range further comprises:

determining the exposure start time as a sum of the infrared light emission time and the first time period.

16. A Time-of-Flight (TOF) camera, comprising a data processor, an infrared light emitter and an image sensor, wherein the data processor is configured to receive parameter control information containing infrared light emission time, exposure start time and exposure end time, configure emission time of the infrared light emitter in accordance with the infrared light emission time, and configure an exposure parameter for the image sensor based on the exposure start time and the exposure end time, the infrared light emitter is configured to emit infrared light in accordance with the infrared light emission time, and the image sensor is configured to perform exposure in accordance with the exposure start time and the exposure end time to generate data of an image containing an object located within a predetermined target distance range, wherein a time period required for the TOF camera to receive infrared light reflected from a position having a distance equal to the upper limit distance value after emitting the infrared light, is associated with an upper limit distance value of the predetermined target distance range, wherein the exposure end time for the TOF camera to stop receiving reflected infrared light is a sum of the infrared light emission time, the time period and a predetermined exposure extension time period, wherein, during the predetermined exposure extension time period, the TOF camera receives infrared light emitted by the TOF camera and reflected by a surrounding environment of the TOF camera, wherein the predetermined target distance range is dependent on the surrounding environment of the TOF camera, and the predetermined exposure extension time period is independent of the surrounding environment of the TOF camera.

17. The TOF camera of claim 16, wherein the time period is a second time period, and wherein a first time period required for the TOF camera to receive infrared light reflected from another position having a distance equal to the lower limit distance value after emitting the infrared light, is associated with a lower limit distance value of the predetermined target distance range.

18. The TOF camera of claim 17, wherein the exposure start time is a sum of the infrared light emission time and the first time period.

* * * * *